No. 660,689. Patented Oct. 30, 1900.
F. H. P. P. ORAM.
TILLAGE MACHINE.
(Application filed June 11, 1900.)

(No Model.) 8 Sheets—Sheet 3.

No. 660,689. Patented Oct. 30, 1900.
F. H. P. P. ORAM
TILLAGE MACHINE.
Application filed June 11, 1900.
(No Model.) 8 Sheets—Sheet 5.

Witnesses
H. K. Boulter
A. E. Boulter.

Inventor
Frederick H. P. P. Oram
By Wm E Boulter
Attorney

No. 660,689. Patented Oct. 30, 1900.
F. H. P. P. ORAM.
TILLAGE MACHINE.
(Application filed June 11, 1900.)

(No Model.) 8 Sheets—Sheet 6.

FIG. 8.

No. 660,689. Patented Oct. 30, 1900.
F. H. P. P. ORAM.
TILLAGE MACHINE.
(Application filed June 11, 1900.)
(No Model.) 8 Sheets—Sheet 7.

FIG. 9.

Witnesses
H. K. Boulter
A. E. Boulter

Inventor
Frederick H. P. P. Oram
By Wm. E. Boulter,
Attorney

No. 660,689. Patented Oct. 30, 1900.
F. H. P. P. ORAM.
TILLAGE MACHINE.
(Application filed June 11, 1900.)

(No Model.) 8 Sheets—Sheet 8.

Witnesses
H. H. Boulter.
A. E. Boulter.

Inventor
Frederick H. P. P. Oram
By Wm E. Boulter.
Attorney

THE NORRIS PETERS CO., PHOTO-LITHO., WASHINGTON, D. C.

UNITED STATES PATENT OFFICE.

FREDERICK HENRY PAUL PETTIT ORAM, OF LONDON, ENGLAND.

TILLAGE-MACHINE.

SPECIFICATION forming part of Letters Patent No. 660,689, dated October 30, 1900.

Application filed June 11, 1900. Serial No. 19,805. (No model.)

*To all whom it may concern:*

Be it known that I, FREDERICK HENRY PAUL PETTIT ORAM, a subject of the Queen of England, residing at Tottenham, London, Middlesex county, England, have invented certain new and useful Improvements in or Relating to Tillage-Machines, (for which I have made application for Letters Patent in Great Britain, No. 12,318, dated June 13, 1899,) of which the following is a specification.

This invention relates to a machine for the tillage of land capable of carrying out the operations of weeding, intertillage, deep tillage, and subsoiling, the ground being rendered fit for the reception of seeds or plants in one operation.

The operation of weeding as carried out by a machine constructed according to this invention is effected by rotatable digging devices the blades of which are preferably wider than those used for tillage and are only allowed to cut lightly into the surface soil, enabling the weeds and other roots to be subsequently easily removed. The operation of intertillage is effected by placing one or more sets of rotatable tines or other rotatable digging devices at such distances apart axially that they will operate in the soil between the two rows of vegetation requiring intertillage. The operations of deep tillage and subsoiling are carried out by a machine such as is hereinafter described in detail.

The machine may be adapted to be drawn or actuated by animal power or steam or other motive power. It may be moved upon the land by means of a cable, or it may be secured to the rear of a traction-engine and driven direct from the same.

The machine comprises a rigid frame mounted upon broad-rimmed wheels. At the rear of the frame and preferably extending to the side far enough to cover the track of one or both of the side wheels is mounted a digger comprising a shaft driven at a high speed of rotation and provided with projecting tines or digging or cutting blades, preferably of different radii and alternated in the manner hereinafter described. The velocity of the tips of the blades or tines in the circumference in which they travel is much greater than the velocity with which the machine moves over the ground in order that the full efficiency of my improved tillage-machine may be obtained from it. The shaft carrying the blades may be driven from the wheels which carry the frame of the machine, and one or more fly-wheels are preferably interposed between the wheels and digging device, the latter being provided with means for adjusting it into and out of action while it is kept in gear with the fly-wheels, the object of this provision being to enable the fly-wheels to be given a high velocity prior to commencement of the actual operation of digging. By thus operating the machine the fly-wheels accumulate a store of energy amply sufficient to prevent the action of the digging device being stopped by coming into contact with the ground when it is lowered into action. A secondary use of the fly wheel or wheels is to insure that the rotation of the digging device after it gets into action shall be uniform and unchecked by obstacles such as are ordinarily met with in the soil.

The digging device is arranged to be raised or lowered to enable the fly-wheels to accumulate energy, as aforesaid, and to vary the depth of earth turned over by it and also to permit the blades to be raised above the earth during transport, when they are not required to do any work.

To enable the digging device to be raised and lowered, it may be carried by toothed quadrants adjustable by a hand-wheel geared with the quadrants, these being arranged to turn about an axis concentric with one of the shafts of the driving mechanism, so that a chain connecting such shaft and the digging device will not be interfered with when the latter is raised and lowered.

Instead of carrying the digging device upon toothed quadrants it may be carried by a swing-frame adapted to turn about the axle of some of the wheels which carry the machine, the whole of the driving-gear being mounted upon this frame. Any convenient form of adjusting-gear—say a screw-shaft provided with a hand-wheel—may be arranged to control the movements of the frame, so that the end thereof to which the digging device is secured may be raised or lowered at will.

If preferred, the digging device may be driven direct by a motor or engine mounted upon the tillage-machine in place of being driven when the latter is hauled by the revolution of the wheels carrying the machine, or the machine may be secured upon a traction-engine, the fly-wheel or other revolving part of the engine being geared to the digging device, so that this latter is driven directly. In this case the wheels carrying the machine will do no driving. A further alternative would be the connection of a distinct tillage-machine to a traction-engine, which could haul it and could also supply power to the operative parts from the traction-engine fly-wheel.

In the accompanying drawings.

Like letters indicate like parts throughout the drawings.

Figure 1:
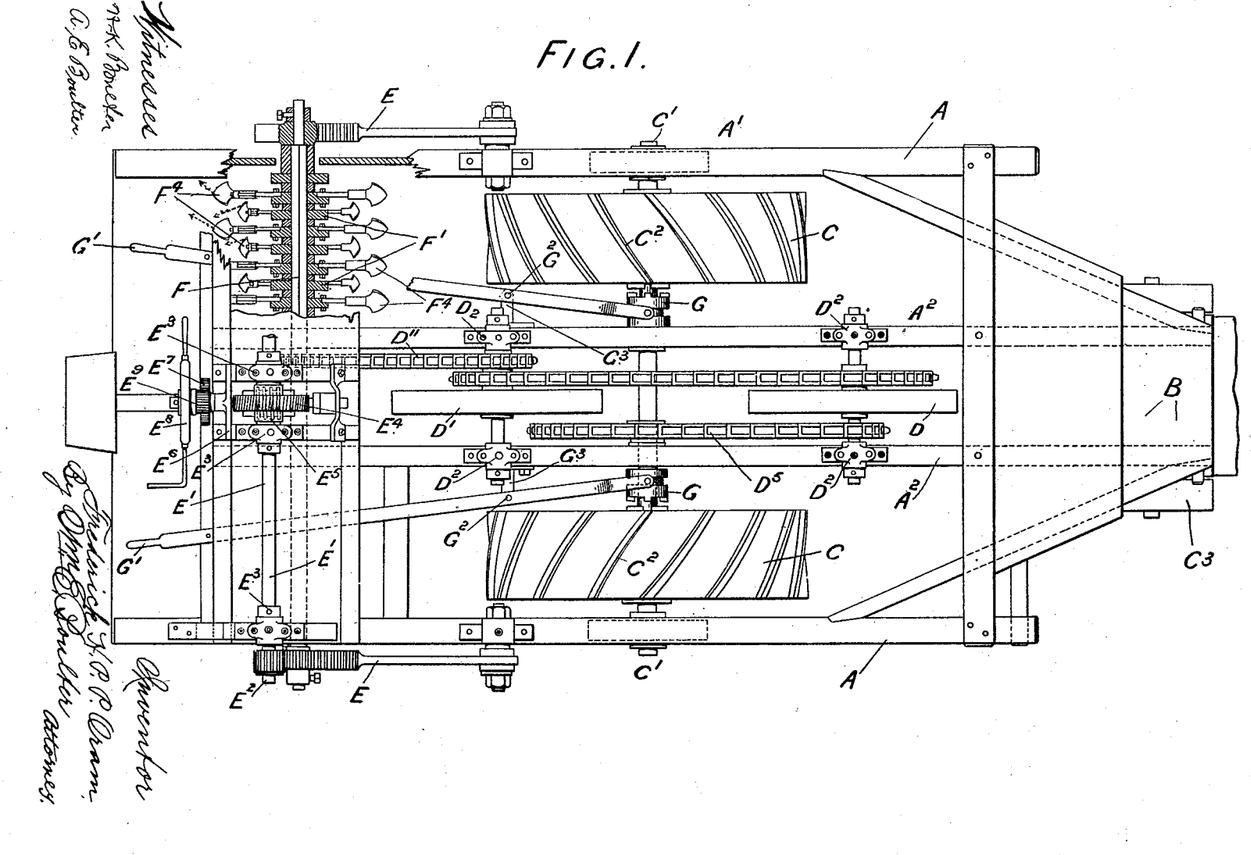
Figure 1 is a plan view, partly in section, of a machine constructed according to one method of carrying out this invention.
Figure 2:
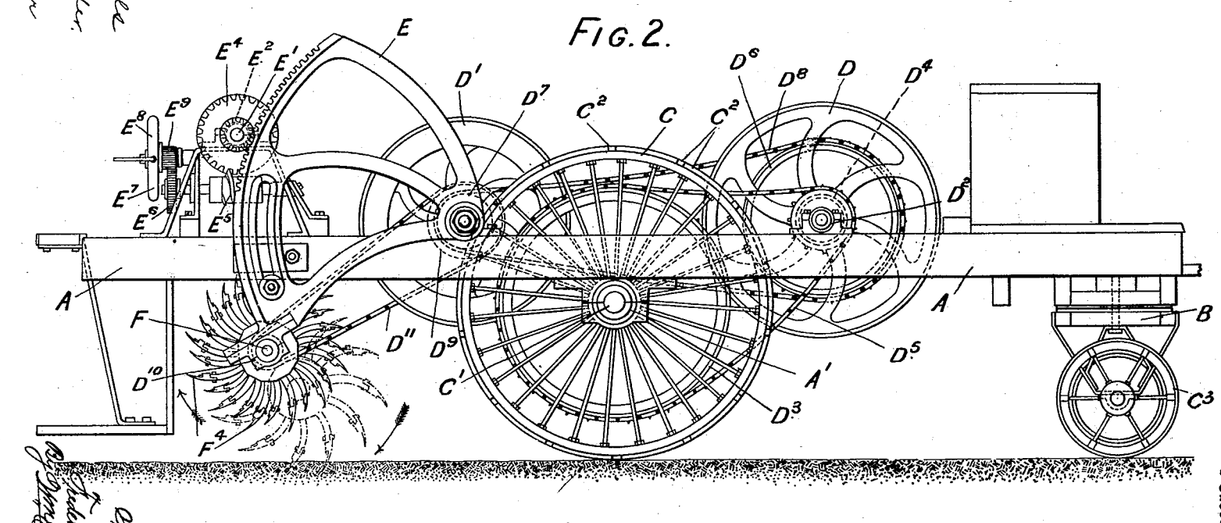
Fig. 2 is a side elevation of the same.
Figure 3:
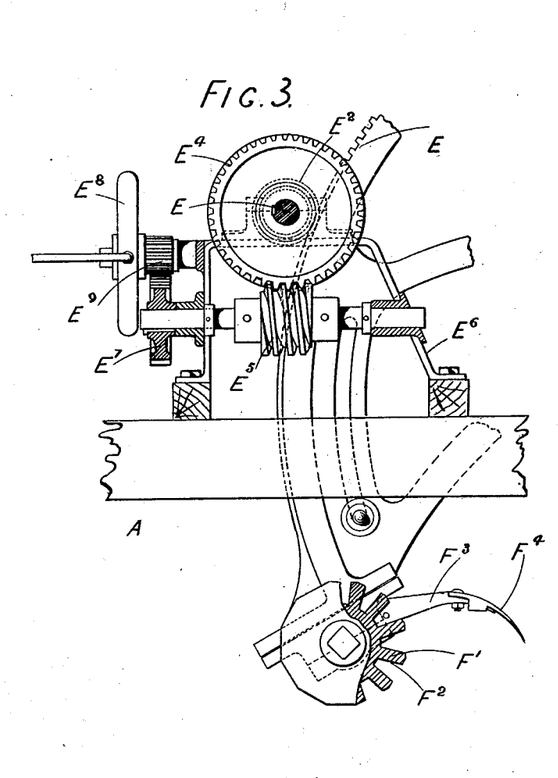
Figs. 3, 4, and 5 are enlarged detail views of parts of the apparatus shown in Figs. 1 and 2.
Figures 4, 5:
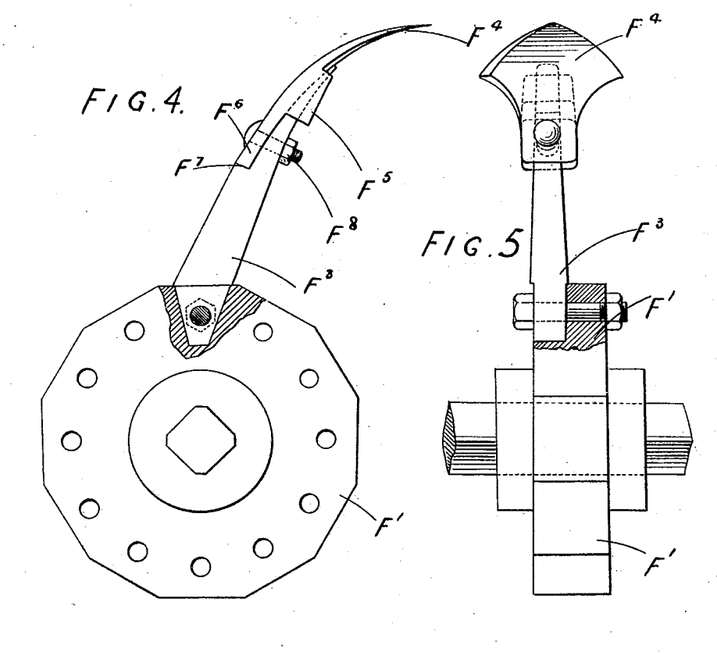

With reference first to Figs. 1 to 5, which illustrate a machine adapted to be hauled by animal or other power, a rigid frame A, conveniently provided with a swiveling fore-carriage B, is carried by broad-rimmed wheels C $C^3$. The wheels C are mounted free upon an axle or shaft C', and the frame A is conveniently carried by means of bearings A' upon the ends of the axle C', which project beyond the wheels C. Within the frame A is arranged a secondary frame $A^2$, comprising two longitudinal members connected at each end by any convenient struts or ties, and on this frame are mounted fly-wheels D D', carried in bearings $D^2$. Concentric with the fly-wheel D' are pivoted toothed quadrants E, one on each side of the frame A, and at the lower end of these quadrants is mounted a shaft F. The axle C' is geared to the fly-wheel D by large and small sprocket-wheels $D^3$ $D^4$, respectively, connected by a chain $D^5$. Similarly the fly-wheel D is geared to the fly-wheel D' by large and small sprocket-wheels $D^6$ $D^7$, connected by a chain $D^8$, and the fly-wheel D' is geared to the shaft F by large and small sprocket-wheels $D^9$ $D^{10}$, connected by a chain $D^{11}$. By this gear the angular velocity of the shaft F is many times greater than that of the wheels C. Fast upon the shaft F, which is preferably square except at its ends, are a series of disks F', (shown in detail in Figs. 3, 4, and 5,) and each disk is provided with a series of recesses or sockets $F^2$, Fig. 3, each adapted to receive an arm $F^3$ of a digging-blade $F^4$. Each blade $F^4$ is provided with a socket $F^5$, which fits over and receives the end of the arm $F^3$ allotted to it. Preferably the acting face of each blade is very slightly aslant or helical, so as not to throw the earth directly to the rear, but rather to one side or the other. Alternate disks have their blades so slanted that the earth thrown off by one circular series or ring of blades is projected into the path of that which is flung off by the adjacent series, as indicated by the dotted arrows in Fig. 1. Thus the earth dug is well mixed. An extension $F^6$ on each blade abuts (see Fig. 4) against a shoulder $F^7$, with which each arm $F^3$ is provided, and aids in keeping the blade in proper position on the arm, a bolt $F^8$ being passed through this extension and the arm to secure them together. Each alternate set of blades is made shorter than those on either side of it, and the blades of these alternate sets are in "mocking" position—i. e., are arranged along transverse lines approximately midway between the lines of blades of the other sets, as shown in Fig. 2, in which to avoid confusion in the drawings only two of one ring of shorter blades are shown. All of the blades are curved, as shown in Fig. 1, so that they readily enter the ground as they revolve. Each blade removing the small portion of earth coming within its range, the whole series of blades very completely reduces and intermixes the earth to the desired depth throughout the area traversed by it. The difference in the length or radius of alternate rings of blades causes the earth at the bottom of the "cuts" to be left in a ridged or serrated condition, the surfaces of the ridges being thoroughly "scratched" by the blade-tips.

To operate the toothed quadrants E, a shaft E' is provided, having pinions $E^2$ mounted one at each end of the shaft and arranged to engage the teeth of the quadrants. The shaft E' is conveniently carried in bearings $E^3$ on the frame of the machine, and approximately midway upon the shaft is mounted the wheel $E^4$, gearing with a screw $E^5$. The screw $E^5$ is conveniently carried in bearings secured to a support $E^6$ and is provided at one end with a spur-wheel $E^7$. A hand-wheel $E^8$, mounted in any convenient manner, (preferably upon the support $E^6$,) has secured to it a pinion $E^9$, which gears with the spur-wheel $E^7$. Clutches G of any convenient or well-known construction are mounted on the axle C' and provided with operating-levers G', so that the wheels C, normally free on the shaft C', may be thrown into gear with that shaft when it is desired that they shall drive the same. The levers G' may be pivoted at $G^2$ to any convenient part of the machine, such as the brackets $G^3$ on the secondary frame $A^2$.

To prevent the driving-wheels C from slipping when the machine is hauled and the digging mechanism is being operated by them, angle-plates C² may be secured upon their outer circumferences.

The operation of this machine is as follows: Presuming the clutches G to be in engagement with the driving-wheels C, the whole of the mechanism geared with the axle C' by the sprocket-wheel D³ will revolve, so that the fly-wheels D D' and digging device, comprising the tines or blades F⁴, mounted on the shaft F, will be revolved at a high speed. To bring this device into operation, the hand-wheel E⁸ may be revolved, thus revolving the pinions E² and lowering the quadrants E according to the depth to which it is desired that the blades F⁴ shall enter the ground. The fly-wheels D D' will maintain sufficient momentum to enable the digging device to readily enter the ground at the start, and they will subsequently overcome unevenness in the resistance offered by the ground to the digging device. Being arranged one in front of and the other to the rear of the shaft C', their weight will tend to balance the machine.

Figure 6:
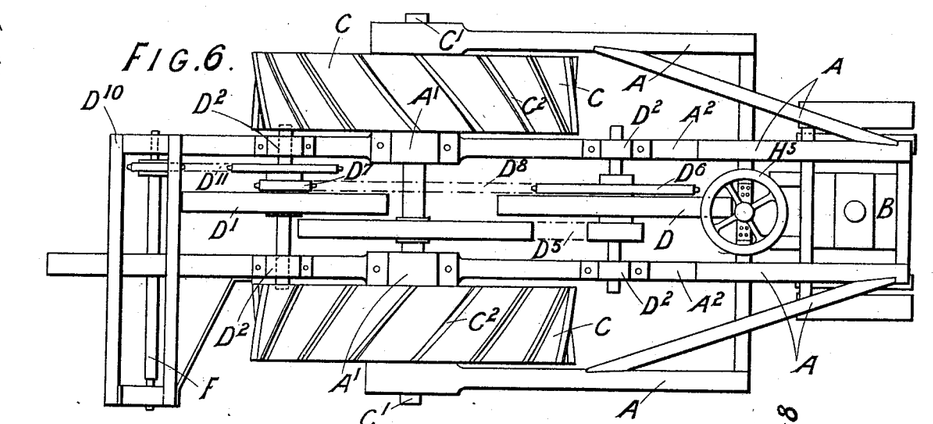
Fig. 6 is a plan view of an alternative construction of the machine.
Figure 7:
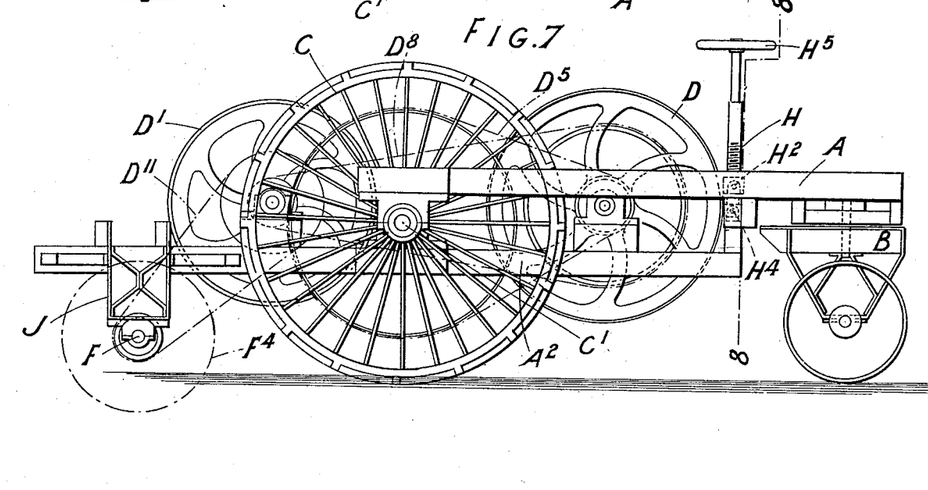
Fig. 7 is a side elevation of the same.
Figure 8:
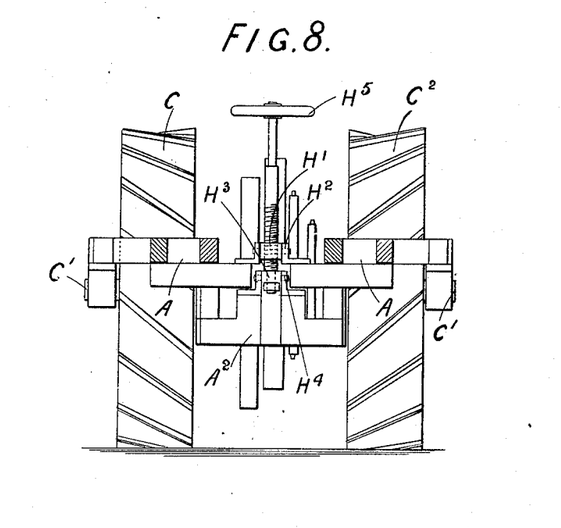
Fig. 8 is a section on the line 8 8 of Fig. 7.

Figs. 6, 7, and 8 show a modified construction of the machine, in which the secondary frame A² is made to swing about the axle C', and thus to raise and lower the digging device. To control the movements of the swing-frame, a screw-shaft H is arranged at the forward end of the frame and passes through a screwed socket or nut H', pivoted at H² to the frame A or to any convenient part secured to the same. The lower end of the screw-shaft H is journaled in a socket H³, pivoted at H⁴ to the swing-frame and compelled to rise or fall with the screw-shaft H. The upper end of the shaft H carries a hand-wheel H³, by which it may be revolved. The shaft F, with its blades, (the circle swept by the latter being indicated by the chain-line circle F⁴ in Fig. 7,) is arranged at the rear of the machine, as before, being carried by any convenient form of brackets J, one only of which is shown in the figure referred to, secured to the swing-frame A². As the fly-wheels D D' are carried in bearings upon the swing-frame and the frame pivots about the axle C', from which the driving-wheels are driven, it is obvious that as one end of the frame is raised or lowered by the screw-shaft H and its hand-wheel H⁵ the gearing operatively connecting the axle C' and shaft F will retain undisturbed its relationship to that axle and shaft, the whole swinging with the frame as one structure.

Figure 9:
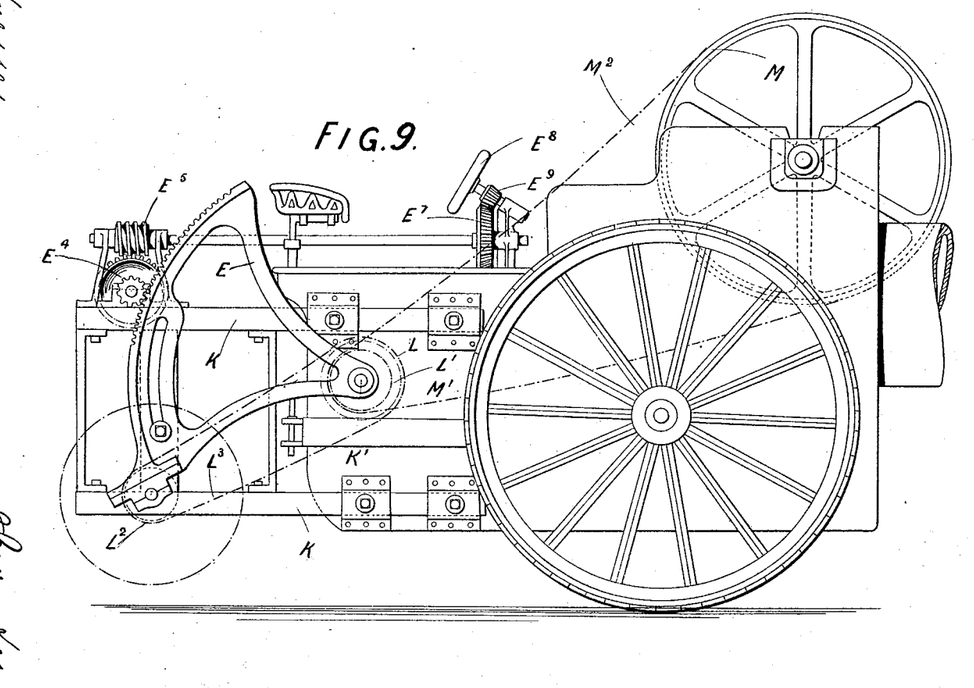
Fig. 9 is a side elevation of another construction of the machine.

Fig. 9 shows another modification, the machine being applied to the rear end of a traction-engine and being driven direct from the engine fly-wheel. Any convenient framing K is provided to carry the quadrants E with the shaft F and its blades, which sweep out the chain-lined circle F⁴. The quadrants E turn about a shaft K', upon which are mounted large and small pulleys L L', respectively, turning freely on the shaft K', but secured to each other. The shaft K', carrying the pulleys, (and passing, in the example illustrated, through the coal-bunker of the engine,) may be supported in bearings secured to any convenient part of the frame K, and the pulley L' is driven from the fly-wheel M of the engine M' by means of a belt M². The pulley L drives a smaller pulley L² on the shaft F by means of a belt L³. The mechanism for the hand-wheel E⁸, controlling the mechanism for operating the quadrant E, may be arranged within reach of the driver of the traction-engine, so that the engine may be driven and the digging device raised or lowered at will by the same person. The frame K, with its mechanism, may project from the traction-engine without having any support from the ground, or it may be provided with trailing wheels to support that end of it which is remote from the engine. Although belts and pulleys have been described as being used in this mechanism, it is obvious that chains and sprocket-wheels may be substituted for the same. Belts and pulleys may be used in place of the chains and sprocket-wheels described with reference to Figs. 1, 2, 6, 7, and 8.

If desired, auxiliary wheels may be arranged on arms at the side of the frame adapted to be raised or lowered, so that when the machine is being conveyed from one part to another—for instance, upon a hard road—the wheels to which the angle-plates are secured may be raised from the ground and the machine made to run upon the auxiliary wheels.

Figure 10:
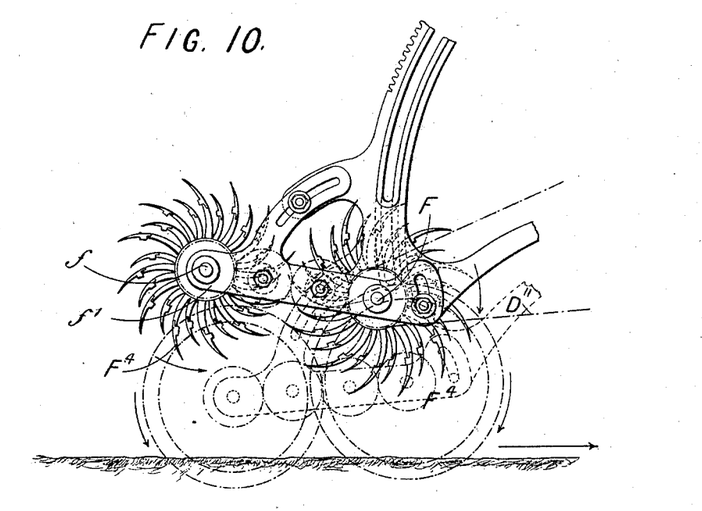
Figs. 10 and 11 are a side elevation and plan view, respectively, of a portion of the machine modified as hereinafter described.
Figure 11:
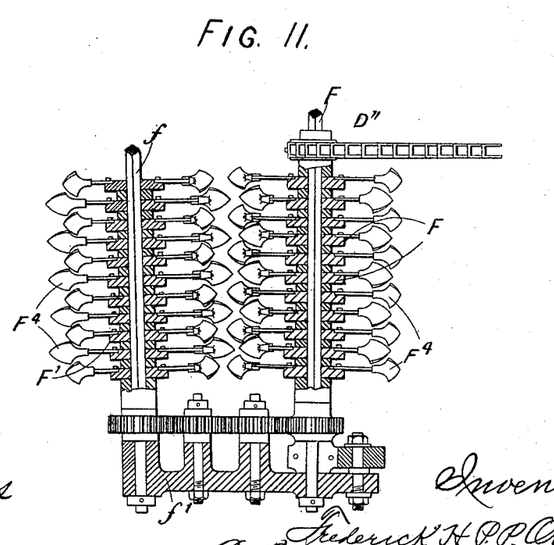

It will be understood that more than one digging device may be used in the same machine, if desired, and the blades on the shaft may either be arranged at one end of the shaft or continued along the whole length of the same, so that the machine may be used to cut either at its right or left hand side or for its full width. If two shafts are used, one, f, may be arranged behind the other, F, as shown in Figs. 10 and 11, or, say, a tilting frame f' and at such a level that its blades cut deeper than the blades on the shaft in front of it, and one of them may be out of parallelism with the other, (see Fig. 11,) so that it will direct the earth dug up toward and at an angle to that which is thrown off by the blades upon its companion, thus mingling thoroughly the earth dug up by both. The direction of rotation of each shaft is indicated by the arrow near the tip of each set of blades in Fig. 1. The direction of motion of the machine is indicated by the large arrow parallel with the ground-line.

What I claim as my invention, and desire to secure by Letters Patent, is—

1. In a tillage-machine, the combination with a rotatable shaft, of series of radially-extending blades carried thereby, the alternate series of blades being shorter than the remaining series, and said shorter blades being arranged along transverse lines approximately midway between the lines of the longer blades, and the blades of each two adjacent series being arranged slantingly whereby the earth thrown off by one series of blades will be projected into the path of that thrown off by the adjacent series.

2. In a tillage-machine, the combination with a supporting-frame, and a wheeled axle mounted therein, of a rotatable shaft, an adjustable support for the latter, series of blades carried by said shaft, the alternate series of blades being shorter than the remaining series, and said shorter blades being arranged along transverse lines approximately midway between the lines of the longer blades, a second rotatable shaft carried by the frame, a fly-wheel on the latter shaft and gearing between the wheeled axle and the said shafts.

3. In a tillage-machine, the combination with a supporting-frame, and a wheeled axle mounted therein, of a rotatable shaft, a second shaft rotatably mounted in the frame, a fly-wheel on said shaft, supports pivotally mounted in the frame at each side thereof and concentrically with the fly-wheel, a shaft rotatably mounted in the said supports, means for radially adjusting the supports, and the shaft carried thereby and holding said supports in adjusted positions, series of blades mounted on the shaft carried by the supports, the alternate series of blades being shorter than the remaining series and said shorter blades being arranged along transverse lines approximately midway between the lines of the longer blades and gearing between the wheeled axle and the fly-wheel shaft and the shaft carrying the blades.

In testimony whereof I have signed my name to this specification in the presence of two subscribing witnesses.

FREDERICK HENRY PAUL PETTIT ORAM.

Witnesses:
CECIL P. W. BOND,
ROSA ORAM.